Patented May 9, 1950

2,507,136

UNITED STATES PATENT OFFICE 2,507,136

ALKALOID PURIFICATION

Manuel M. Baizer, Flushing, N. Y., assignor to New York Quinine and Chemical Works, Incorporated, Brooklyn, N. Y., a corporation of New York No Drawing. Application February 19, 1949, Serial No. 77,452

2 Claims. (Cl. 260—285)

This invention relates to the manufacture of highly purified papaverine hydrochloride from crude papaverine, and has among its objects an improvement in the purification process whereby that process is considerably simplified and made commercially more useful over known processes by greatly reducing the number of purification steps which lead from the crude impure papaverine to a Pharmacopoeial product. Another object is to obtain the purified papaverine in a greatly superior physical form to the commercially available products which will facilitate packaging and dispensing of the alkaloid. Other objects will appear from the following description.

Papaverine hydrochloride is the hydrochloride of the alkaloid papaverine prepared "from opium or synthetically" (Pharmacopoeia of the United States, Thirteenth Revision, page 376). In order to qualify for medical acceptance papaverine hydrochloride must respond to the minimum test for purity required by the U. S. P., known as the "cryptopine" test. Thus, 50 mg. of papaverine hydrochloride dissolved in 2 cc. of sulfuric acid must give a solution the color of which "is not deeper than pale pink, or not more than slightly brown."

In the prior art it has been the practice to separate papaverine from opium bases by means of oxalic acid, to purify the oxalate by recrystallization from water, free the base and purify it. The entire purification process as now known in literature involves a great many recrystallization steps, usually seven and sometimes as many as twenty, and is too cumbersome, time consuming and expensive to be commercially economical. It involves an inevitable loss of material in recrystallization, and that loss, or the expenses of recovery from mother liquors, increases with each additional recrystallization step and make the process even less economical.

In my co-pending application Serial Number 40,420, filed July 23, 1948, I have described an improvement of these known purification processes which broadly comprises removing the more readily separable bulk of the impurities from the crude oxalate of papaverine by recrystallizing the oxalate from water in substantially not more than two recrystallizations, bleaching the free base liberated from the salt, passing it dissolved in an organic solvent through an adsorbent such as activated alumina, precipitating it from the eluent by means of hydrochloric acid, and recrystallizing the papaverine hydrochloride. The entire purification step is thus reduced to substantially three purification steps which lead from the crude impure papaverine to a Pharmacopoeial product.

I have found that nitromethane is particularly useful in this improved purification process. The free papaverine base which is liberated from the recrystallized oxalate will, when dissolved in nitromethane, yield U. S. P. papaverine hydrochloride directly in the effluent on contact with hydrochloric acid without the need for further recrystallization. In that way, further simplification and economy of the purification process is obtained.

I have also found that the resulting hydrochloride has the desirable physical characteristics which make it superior in handling to commercially available products in that it is free-flowing instead of fluffy and does not adhere to non-metallic packaging and dispensing materials.

The following examples illustrate my invention:

PURIFICATION OF NATURAL PAPAVERINE

PART 1.—FROM CRUDE OXALATE TO ALKALOID FOR ADSORPTION TREATMENT

The "crude papaverine oxalate" which is the starting point in this process is a brown solid. It is obtained from a methanolic extract of the benzene-soluble portion of the total alkaloids of opium by the addition thereto of oxalic acid which precipitates the powder.

*First recrystallization of papaverine oxalate*

100 lbs. of crude papaverine oxalate are dissolved in 135 gallons of boiling water. Five pounds of activated carbon are added, and the solution is boiled with stirring for at least 30 minutes. It is filtered hot, and the filtrate is chilled to 20° C. The mass of crystals thus formed is filtered and slurry-washed with a small amount of cold water.

*Second recrystallization of papaverine oxalate*

The same process is employed in this step using 120 gallons of water and 4.5 lbs. of activated carbon. The oxalate is slurry-washed twice.

*Liberation of alkaloid*

The second oxalate is dissolved or suspended in 100 gallons of water at 70° C. or higher. Soda ash is added cautiously with good stirring. When the pH is 7–8, one ounce of sodium hydrosulfite is added and then soda ash to pH 8–9. The precipitated alkaloid is light-tan to white in color, and the liquor pale yellow-green. The solution is cooled to room temperature, the resulting precipitate filtered, slurry-washed free of alkali, and dried at 50° C. overnight.

PART 2.—ADSORPTION TREATMENT WITH ACTIVATED ALUMINA

The papaverine base of Part 1 which gives a strongly pinkish color reaction in sulfuric acid is dissolved in nitromethane at 2/3 of its solubility and passed through a column of activated alumina of from 80-120 mesh, for instance that known as alumina F-20, that was previously saturated with the same solvent. After all the solution has passed through the column, all traces of papaverine are washed out of the column by a small amount of solvent. The papaverine in solution is then converted to the hydrochloride by the drop-wise addition of concentrated hydrochloric acid (1 cc. per 3.39 gms. of papaverine) with mechanical stirring at room temperature or preferably with chilling during precipitation. The precipitated papaverine hydrochloride is removed and air-dried; it is a snow-white product which passes the cryptopine test. The filtrate is evaporated to dryness to recover any papaverine hydrochloride that remained in solution; this product also passed the cryptopine test.

The papaverine hydrochloride thus obtained is a granular powder which does not tend to adhere to non-metallic packaging and dispensing materials and is free-flowing.

Instead of the oxalate I may use the salts of any other acids capable of forming with the crude papaverine a compound insoluble in cold, but fairly soluble in hot water, such as succinic acid, hydroferricyanic acid, and thiocyanic acid. The organic solvent will, in general, be one capable of dissolving substantial quantities of the base but not reacting with it, compatible with the adsorbent, and a poor solvent for papaverine hydrochloride and stable toward cold concentrated hydrochloric acid.

The reactants and operating conditions described in the foregoing examples can be modified in various ways to perform the process to best advantage. They are controlled by the nature, amount and distribution of the impurities in various grades of crude impure papaverine which are to be processed at maximum efficiency for each grade. I consider such variations and modifications to be within the scope of my invention and covered by the appended claims.

I claim:

1. Improved manufacture of pure papaverine hydrochloride which comprises dissolving in boiling water a crude papaverine salt insoluble in cold and fairly soluble in hot water, treating the boiling solution with a decolorizing agent, filtering and chilling it, filtering the precipitated salt crystals, washing them with cold water, and repeating said recrystallization from boiling water once; dissolving the twice recrystallized salt in hot water, stirring the solution while alkalinizing it to pH 7-8, adding a small amount of sodium hydrosulfite, and further alkalinizing the solution to pH 8-9 whereby the free base is precipitated; filtering the base, washing and drying it, dissolving it in nitromethane, chromatographing the solution thru a column of activated alumina previously flushed with nitromethane, chilling the eluate, adding concentrated hydrochloric acid slowly with stirring whereby papaverine hydrochloride is precipitated, and recrystallizing the hydrochloride once from methanol.

2. The process of claim 1 in which the crude papaverine salt is the oxalate and an activated alumina of from 80 to 120 mesh is used for chromatographing.

MANUEL M. BAIZER.

No references cited.